United States Patent [19]
Deluca et al.

[11] Patent Number: 5,754,119
[45] Date of Patent: May 19, 1998

[54] MULTIPLE PAGER STATUS SYNCHRONIZATION SYSTEM AND METHOD

[75] Inventors: Michael J. Deluca; Joan S. Deluca, both of Boca Raton, Fla.

[73] Assignee: Motorola, Inc., Schaumburg, Ill.

[21] Appl. No.: 522,026

[22] Filed: Aug. 31, 1995

[51] Int. Cl.[6] .................................................. H04Q 7/18
[52] U.S. Cl. ...................... 340/825.21; 340/311.1; 340/825.44; 370/313; 455/426; 455/31.3; 455/88; 455/70
[58] Field of Search ..................... 340/825.21, 311.1, 340/825.44, 825.47, 825.52, 825.69, 313; 455/31.1, 426, 31.2, 31.3, 88, 70; 370/310, 311, 312, 313, 314

[56] References Cited

U.S. PATENT DOCUMENTS

| | | |
|---|---|---|
| 4,412,217 | 10/1983 | Willard et al. . |
| 4,682,148 | 7/1987 | Ichikawa et al. . |
| 4,851,829 | 7/1989 | DeLuca et al. . |
| 4,875,038 | 10/1989 | Siwiak et al. . |
| 4,952,929 | 8/1990 | DeLuca et al. . |
| 5,124,697 | 6/1992 | Moore . |
| 5,153,582 | 10/1992 | Davis . |
| 5,168,493 | 12/1992 | Nelson et al. . |
| 5,221,838 | 6/1993 | Gutman et al. . |
| 5,225,826 | 7/1993 | Deluca et al. ............ 340/825.44 |
| 5,258,751 | 11/1993 | Deluca et al. ............ 340/825.44 |
| 5,365,227 | 11/1994 | Cannon et al. ........... 340/825.44 X |
| 5,481,258 | 1/1996 | Fawcett et al. ........... 340/825.47 |
| 5,561,848 | 10/1996 | Minami .................... 340/825.44 X |
| 5,596,318 | 1/1997 | Mitchell ................... 340/825.44 |

OTHER PUBLICATIONS

Motorola Product Family 255 Service Manual, 1995 by Motorola, Inc., Boynton Beach, Florida, part No. 6881024B80, Aug. 1995.

Motorola Product Family 255 Controller Supplement, 1995 by Motorola, Inc., Boynton Beach, Florida, part No.6881024B80, Aug. 1995.

Introduction to the Wireless Concert!, 1995 by Motorola, Inc., Fort Worth, Texas, part No. 6880491G01, August 1995.

*Primary Examiner*—Michael Horabik
*Assistant Examiner*—William H. Wilson, Jr.

[57] ABSTRACT

Status changes made on first pager (130 and 530) are wirelessly communicated to an infrastructure (110 and 510) which communicates the status changes to other pagers (150 and 550) so that the other pagers make corresponding status changes. Thus, a user's status changes made on one pager are automatically made on the user's other pagers. Status changes include changes to received messages, alarm times, alert thresholds, and key word alerts.

11 Claims, 3 Drawing Sheets

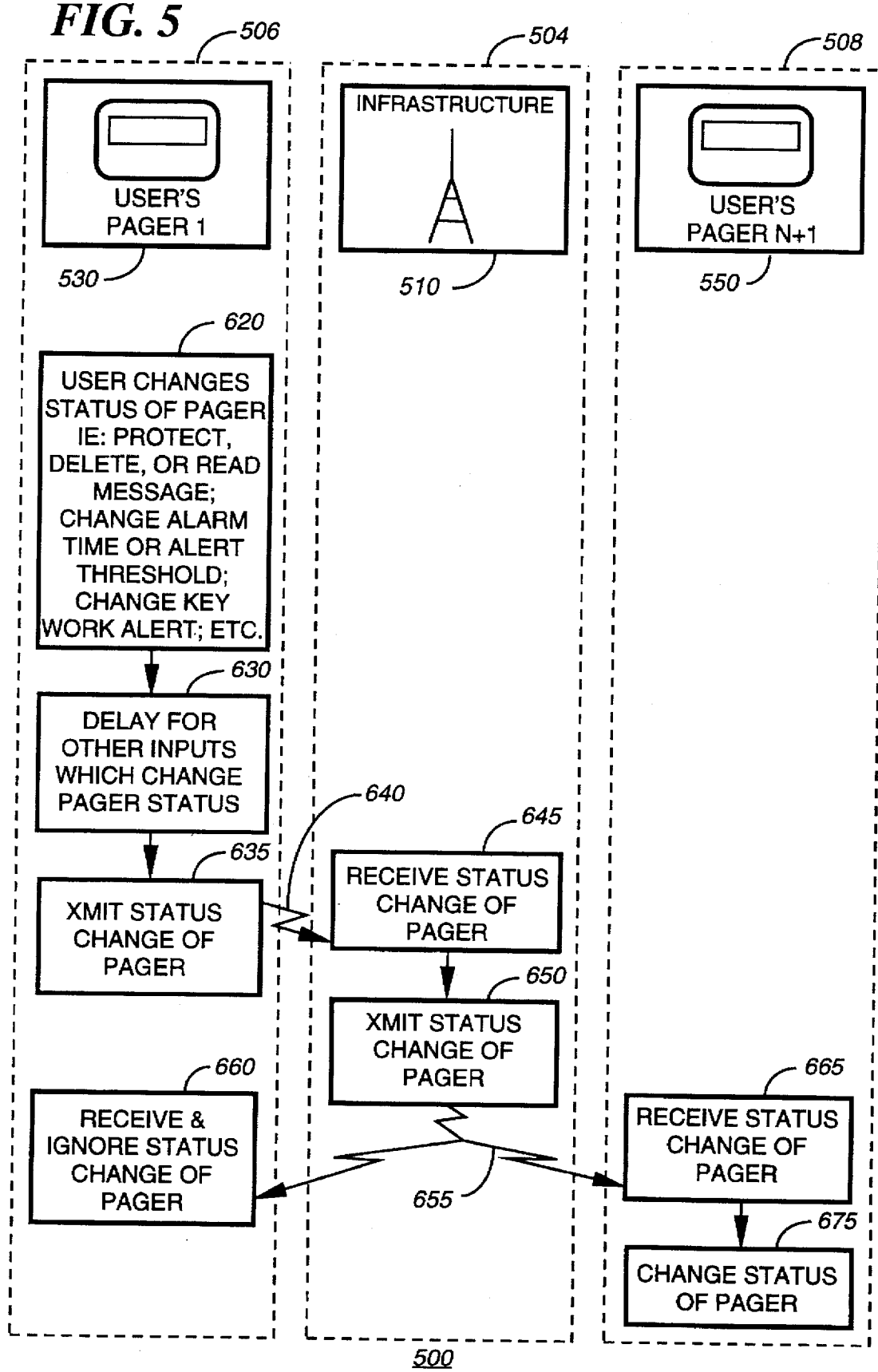

MULTIPLE PAGER STATUS SYNCHRONIZATION SYSTEM AND METHOD

FIELD OF THE INVENTION

This invention relates generally to the field of two-way communication devices and, in particular, to information managed therein.

BACKGROUND OF THE INVENTION

As the acceptance of selective call communication devices, or pagers, including two-way pagers, continues to grow, and as their affordability continues to improve, some users are acquiring pagers which have a same selective call address. Pagers come in different form factors or colors to complement a user's attire. Thus, the user carries one pager at one time with one apparel outfit and another pager at another time with another outfit. For example, a neon colored belt worn pager is used for a day at the beach, and a black and gold pen pager with a business suit is used for an evening business meeting.

Reductions in battery power consumption technology have resulted in substantial improvement in battery life of a pager. Thus, it is feasible for a user to leave a pager on twenty-four hours per day to assure continuous reception of paging messaging while also maintaining an acceptable battery life.

However, a problem arises when the user has multiple pagers which are left continuously on. For example, messages received by a pager carried by a user are also received by the user's other pagers which are not carried at that time. Disadvantageously, with known pagers, message status changes made by the user on the carried pager are not made on the user's other pagers. If a user reads, deletes, or protects a message on the carried pager, the message remains as an unread message on the user's other pagers. Thus, when the user changes attire and corresponding pagers, the user is faced with a different pager having messages with an unread status, which are identical to messages previously read, deleted or protected on another pager. Thus, the user must again read and decide the status of each message received on the other pager. This additional tedious task required after each change of a pager poses an inconvenience to the user that could deter a user from acquiring a number of pagers in different form factors and colors. Thus, what is needed is a way to have message status changes made on any one of the user's pagers automatically made on the user's other pagers.

A similar problem arises when the user has multiple pagers and the user changes configuration information stored in one of the pagers, as, for example, when the user changes, on the carried pager, the time of a daily alarm, or the type of alert produced when a message from a certain user or a message having a certain content is received. The latter situation occurs when the user subscribes to an information service that communicates many news items. For this kind of service, the user may desire an audio alert when specific items of information are received. Examples include changes in the value of a financial instrument or a key word or phrase indicative of a popular news item. Typically, a user wants the configuration of the interface on each of the user's pagers to be substantially identical in order to maintain a familiarity with the interface. However, the user of several pagers would be inconvenienced with having to change the configuration information stored in each of the pagers.

Thus, what is needed is a way to have status changes to a pager configuration made on any one of a plurality of the user's pagers automatically made on the other one or ones of the plurality of the user's pagers.

SUMMARY OF THE INVENTION

One aspect of the present invention is a method of communicating changes in a status of message information in a pager. The method includes the steps of: receiving a first message from a source, the first message having first information for a communication device and having a status associated therewith; changing the status of the first information responsive to an input to the device; and transmitting a second message having second information indicative of the status of the first information to the source responsive to the step of changing.

Another aspect of the invention is a method of synchronizing message information among a plurality of transceivers that includes the steps of: transmitting, by a messaging infrastructure, a first message having a first status; in one transceiver of the plurality of transceivers, changing the first status of the first message to a second status responsive to an input to the one transceiver, and transmitting a second message indicative of the second status; in the infrastructure, transmitting a third message indicative of the second status; and, in at least one other transceiver of the plurality of transceivers, receiving the third message, and in response to receiving the third message, changing the first status of the first message to the second status.

Still another aspect of the invention is a method of synchronizing a status category of a plurality of transceivers. The method includes the steps of: in a first transceiver, changing the status of the first transceiver from a first status to a second status, and transmitting a first message indicative of the second status; and also including, in a messaging infrastructure, the steps of: receiving the first message, and transmitting a second message indicative of the second status; and further including, in a second transceiver, the steps of: receiving the second message, and changing a status of the second transceiver to the second status in response thereto. Yet another aspect of the invention is a system for synchronizing a status category of a plurality of devices communicating with an infrastructure, in which each of the plurality of devices has at least one status category, and in which each of the at least one status category has a plurality of states. The system includes means for changing a status category of the at least one of the plurality of devices to produce a current state of the status category; means in the at least one of the plurality of devices to produce a synchronizing signal for signaling to the infrastructure the current state of the status category; means in the infrastructure to produce a current state signal for signaling to an other of the plurality of devices the current state of the status category of the one of the plurality of devices in response to the synchronizing signal; and means in the other of the plurality of devices for changing the current state of the at least one status category of the other of the plurality of devices to the current state of the at least one of the plurality of devices in response to the current state signal.

A further aspect of the invention is a system for synchronizing messages among a multiplicity of selective call transceivers communicating with a paging infrastructure. The paging infrastructure has a base transmitter and a controller. Each transceiver has a processor and a transmitter. Each transceiver also has at least one status category, and each of the at least one status category has a plurality of states. The system includes: a user interface on at least one of the transceivers for changing a state of a status category of the at least one of the transceivers to produce a synchronizing signal, the user interface being coupled to the processor; a software element at the processor for controlling transmission of a synchronizing signal by the transmitter after a change of state of a status category; and another software element at the controller for controlling transmission of a current state signal by the base transmitter in response to the synchronizing signal.

BRIEF DESCRIPTION OF THE DRAWINGS

FIG. 5 is a flow diagram of a system and method for synchronizing status of multiple pagers operating in accordance with the preferred embodiment of the present invention.

DESCRIPTION OF THE PREFERRED EMBODIMENT

Figure 1:
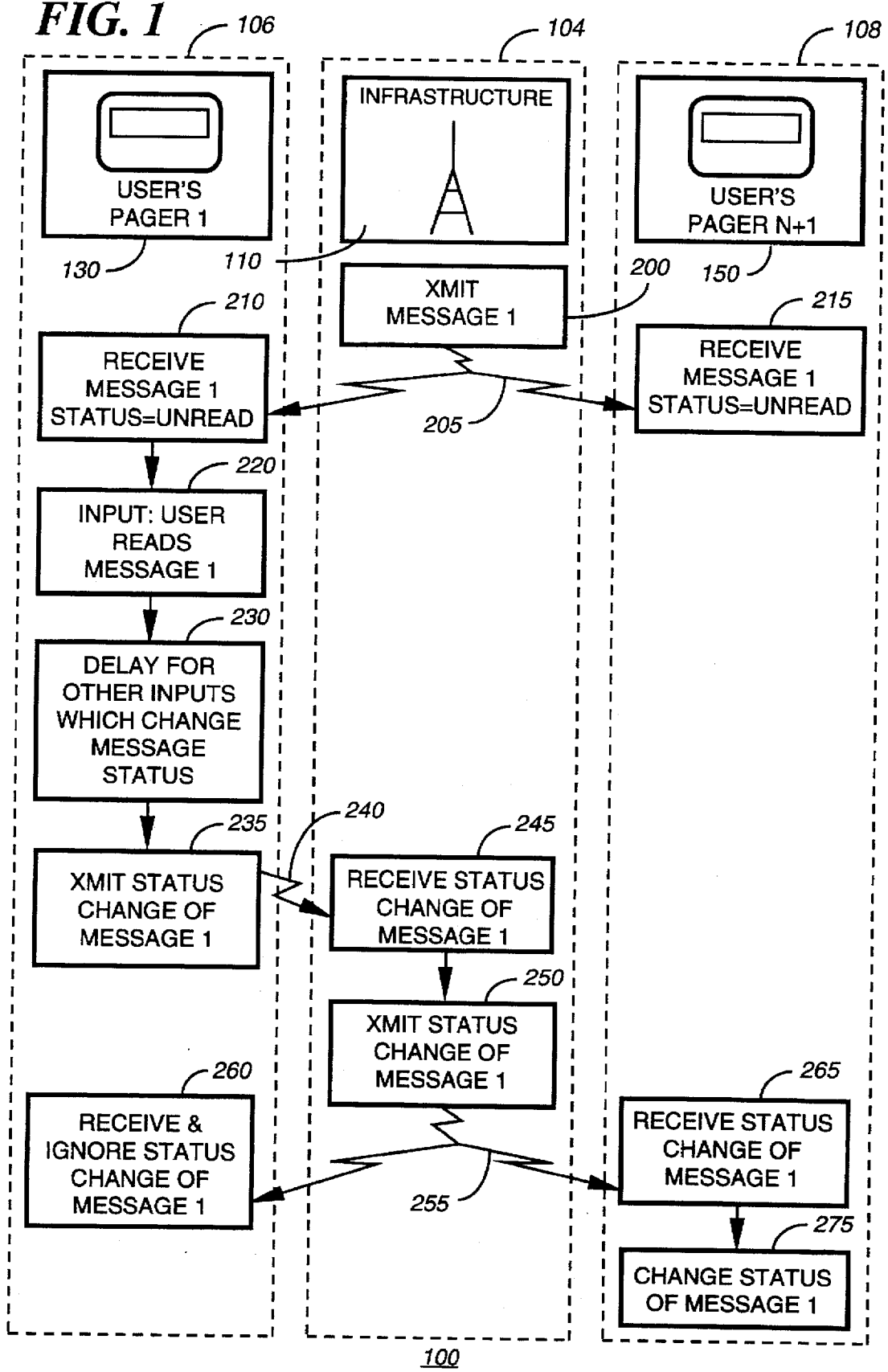
FIG. 1 is a flow diagram of a system and method for synchronizing messages of multiple pagers operating in accordance with a preferred embodiment of the present invention.

FIG. 1 shows a flow diagram 100 of a system and method for synchronizing messages of multiple selective call transceivers, or two-way pagers, operating in accordance with the present invention. The invention preferably operates with a two-way paging communication system that allows communication both to and from pagers such as the system described in U.S. Patent No. 5,168,493 entitled "Time Division Multiplexed Selective Call System" issued Dec. 1, 1992 to Nelson et al., assigned to the assignee of the present invention, and which is hereby incorporated by reference herein. The invention preferably operates with the Motorola ReFleX™ two-way wireless paging system infrastructure and protocol described in detail in the following U.S. patent applications assigned to the assignee of the present invention: application Ser. No. 08/131,243 entitled "Method and Apparatus for Delivering Messages to Portable Communications Units in a Radio Communication System" filed Oct. 4, 1993 by Simpson et al. now U.S. Pat. No. 5,475,863; application Ser. No. 08/398,274 entitled "Method and Apparatus for Optimizing Receiver Synchronization in a Radio Communication System" filed Mar. 3, 1995 by Ayerst, et al. allowed and issue pending; application Ser. No. 08/404,698 entitled "Method and Apparatus for Organizing And Recovering Information Communicated in a Radio Communication System" filed Mar. 15, 1995 by Ayerst et al. now U.S. Pat. No. 5,644,568; application Ser. No. 08/498, 212 entitled "Method and Apparatus For Inbound Channel Selection In A Communication System" filed Jul. 5, 1995 by Ayerst et al. now U.S. Pat. No. 5,638,369; and application Ser. No. 08/502,399 entitled "A System and Method for Allocating Frequency Channels in a Two-way Messaging Network" filed Jul. 14, 1995 by Wang et al. pending, which are hereby incorporated by reference herein. It should be appreciated that other two-way communication systems are also contemplated.

A communication system in accordance with the preferred embodiment of the present invention comprises a fixed portion and a portable portion. The fixed portion comprises a wireless messaging infrastructure, or infrastructure, 110 that provides interfacing between a pager and typically a public switched telephone network (PSTN) for communication of information with the pager. The operation of infrastructure 110 is well known to those skilled in the art. Preferably, infrastructure 110 is a Motorola ReFlex™ infrastructure modified to perform the operations shown in dotted-line box 104. The fixed portion includes at least one base station, for communicating with the portable portion, utilizing the ReFlex™ protocol and coupled by communication links to a controller that controls the at least one base station. The hardware of the controller preferably includes a Wireless Messaging Gateway (WMG™) Administrator!™ paging terminal, a RF-Conductor!™ message distributor, and a RF-Usher!™ multiplexer, manufactured by Motorola, Inc. The controller has software elements and preferably runs under a UNIX operating system. The hardware of the base station preferably includes a Nucleus® Orchestra!™ transmitter and a RF-Audience!™ receiver, manufactured by Motorola, Inc. A more detailed description of the hardware of the controller and of the base station is described in "Introduction to The Wireless Concert!", published 1995 by Motorola, Inc., which is available for sale to the public as part No. 6880491G01 from Motorola, Inc., Ft. Worth, Tex., and which is hereby incorporated by reference herein. It will be appreciated that other similar hardware can be utilized for the controller and base stations.

Each of the at least one base station transmits or receives radio signals to or from the portable portion via antennas. The radio signals comprise selective call addresses and message transactions between the base stations and the pagers. The controller preferably is coupled by conventional telephone links to PSTN for receiving selective call messages, i.e., messages intended for one or more pagers. The selective call messages comprise voice and data received from the PSTN using, for example, a conventional telephonic-type device or a computer-type device coupled to the PSTN in a manner well known in the art.

The portable portion comprises a plurality of paging transceivers such as pager 130 and 150. Each paging transceiver includes a transmitter and a receiver. The operation of a paging transceiver is well known in the art and is described more fully in U.S. Pat. No. 5,124,697 entitled "Acknowledge Back Pager" issued Jun. 23, 1992 to Moore; U.S. Pat. No. 5,153,582 entitled "Method and Apparatus for Acknowledging and Answering a Paging Signal" issued Oct. 6, 1992 to Davis; and U.S. Pat. No. 4,875,038 entitled "Frequency Division Multiplexed Acknowledge Back Paging System" issued Oct. 17, 1989 to Siwiak et al., which are assigned to the assignee of the present invention and which are hereby incorporated by reference herein. The paging transceiver, pager 130, is preferably a Motorola Tango™ pager and has a microprocessor, or processor, modified to perform the operations shown in dotted-line box 106. The Motorola Tango™ pager is compatible with the ReFlex protocol. The Tango pager is described more fully in the Motorola Product Family 255 Service Manual published 1995 by Motorola, Inc., and in the Motorola Product Family 255 Series Controller Supplement, published 1995 by Motorola, Inc., which are available for sale to the public from Motorola Paging Products Group, Boynton Beach, Fla. as part No. 6881024B80 and part No. 68881104B36, respectively, and which are hereby incorporated by reference herein. Pager 150 is alternatively a receive-only pager, the operation of each of which are well known to those skilled in the art. A software element, residing in memory, preferably read-only memory (ROM), of pagers 130 and 150 is modified to operate the microprocessor, preferably a Motorola M68HC11PH8, within the pager in accordance with the description of FIG. 1. A person skilled in the art of programming modifies the software using a Motorola HC11 Reference Manual, published 1991 by Motorola, Inc., and using a Motorola MC68HC11PH8 Technical Data, published 1995 by Motorola, Inc., which are available for sale to the public from Motorola, Inc., Phoenix, Ariz.

Referring to FIG. 1, dotted-line box 104 encloses a paging infrastructure 110 and steps performed by the paging infrastructure 110; dotted-line box 106 encloses a pager 130 worn by the user and steps performed by pager 130; and dotted-line box 108 encloses at least one pager 150 assigned to the user, but not worn by the user, and steps performed by pager 150. In accordance with the invention, infrastructure 110 receives information intended for the user of pagers 130 and 150. In step 200 a first message 205 having information is wirelessly transmitted and is received by pagers 130 and 150 in steps 210 and 215, respectively. The pagers assign a status to each message. Immediately after reception, the status of the message in both pagers is "unread".

Figure 2:
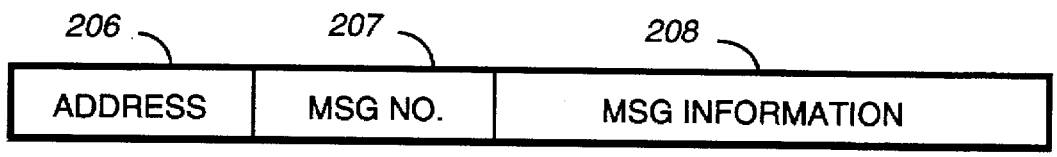
FIG. 2 is a simplified signaling diagram of fields of a first message shown symbolically in FIG. 1.

FIG. 2 shows an example of a first message, or message 205, which includes an address 206 assigned to pagers 130 and 150 for selectively identifying the pagers, a message number 207 assigned by the infrastructure 110 for identifying the message, and message information 208 for communication to the user of pagers 130 and 150. Message 205 is a forward channel message transmitted by the infrastructure for reception by one or more pagers.

Referring again to FIG. 1, in step 220, pager 130 receives an input from the user: typically the user interacts with a user interface by depressing a button on the pager indicating a desire to read the message. The message is then displayed on a pager display so that the user is able to read the message. The act of depressing the button causes the status of message 205 to change from "unread" to "read" in pager 130. During a delay 230, additional changes to message status can occur. The duration of delay 230 is a predetermined time period such as a typical display time out interval where the pager enters a low power mode when message displaying is ended. Other status changes that can occur during the delay 230 include changes to protected or deleted status. After delay 230, the status of the message received by pager 130 is transmitted in step 235 via a second message, that is, message 240.

Figure 3:
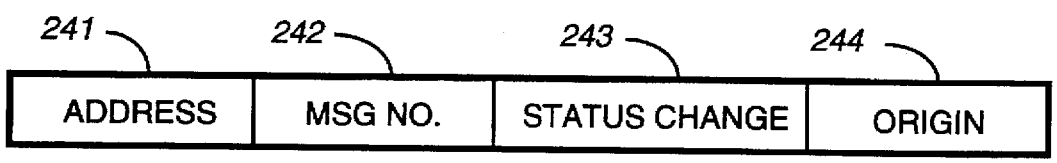
FIG. 3 is a simplified signaling diagram of fields of a second message shown symbolically in FIG. 1.

FIG. 3 shows an example of a second message, or message 240, that includes an address 241, corresponding to address 206, assigned to both pager 130 and pager 150 for selectively identifying the pagers; a message number field 242 assigned by the infrastructure 110 for identifying the number of the message; a status change information field 243 for indicating the status change occurring in step 220 and in delay 230; and an origin field 244 for uniquely identifying the pager 130 which is the source of message 240. Message 240 is a synchronizing signal in a forward channel message transmitted by a pager for reception by the infrastructure. The status change information field 243 comprises, in this embodiment, a status change control signal indicating that status change information (rather than some other type of information) follows, and three bits of status change information: a read/unread bit, a protect bit, and a delete bit. These three bits indicate the corresponding status of the identified message. Alternatively, message 240 has a plurality of message number field 242 and status change information field 243 for communicating changes to multiple messages made during step 220 and delay 230.

Figure 4:
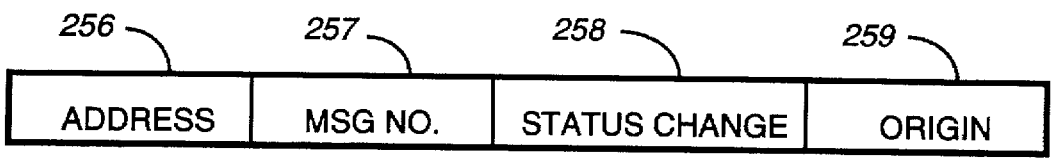
FIG. 4 is a simplified signaling diagram of fields of a third message shown symbolically in FIG. 1.

Infrastructure 110 receives message 240 at step 245. The message is then submitted to a message queue of the infrastructure 110 for transmission by the infrastructure. In step 250, the infrastructure transmits the status of the first message via a third message, or message 255. Message 255 is a forward channel message. FIG. 4 shows the content of message 255 to be substantially identical to message 240. Message 255 has an address field 256 and a message number field 257. Message 255 is received by pager 130 in step 260 and ignored by pager 130 because it was the source of the message. This determination is made by comparing the origin field 259 of message 255 with that assigned to the pager. Message 255 is also received by pager 150 in step 265. Pager 150 determines that message 255 has status change information due to the status change control signal included in status change field 258, and that, in this example, the status change information applies to message 205 in response to message 240. In response, pager 150 changes the status of the first message 205 to correspond to the status set by the user placing inputs to pager 130 at step 220 and delay 230.

Thus, the status of messages received by pagers 130 and by all pagers 150 will be identical after execution of step 275. Thus if a user reads and deletes a message on pager 130, it will also be identified as being read and deleted on pagers 150. Consequently, when the user changes from pager 130 to 150 in response to changing attire, or otherwise, the status of messages in both pagers will be substantially identical. This has the advantage of alleviating the inconvenience of changing the status of unread messages in pager 150.

Furthermore, delay 230 has the advantage of reducing the number status change transmissions. For example, when a user receives a message, the first action taken is to read the message. Without delay 230, message 240 and message 255 would be transmitted indicating a change from "unread status" to "read status". This status change would then occur in pager 150. A short time after having read the message the user may either protect or delete the message, and again, message 240 and message 255 would be transmitted indicating a change from the "read" status to the "protect" or "delete" status. When delay 230 is added and if the second status change occurs within the delay interval of delay 230, only a single set of messages consisting of message 240 and message 255 is transmitted indicating a change in message status from "unread" to "protect" or "delete". Thus, in this example, delay 230 reduces by 50% the amount of messages communicated in the paging system in order to keep the pager 130 and the pager 150 synchronized. This has the advantage of reducing the loading of the infrastructure caused by messages sent in accordance with this invention.

Figure 6:
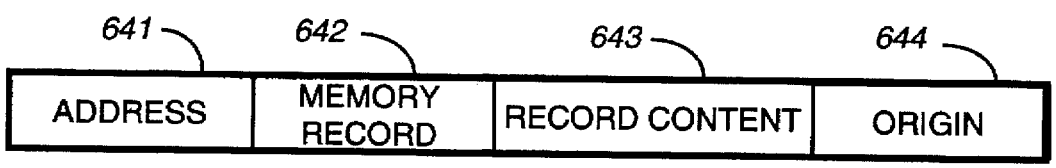
FIG. 6 is a simplified signaling diagram of fields of a message, shown symbolically in FIG. 5, transmitted by a pager, for changing status of another pager in accordance with the preferred embodiment of the present invention.

FIG. 5 shows a flow diagram 500 of a system for synchronizing status of multiple pagers operating in accordance with the present invention. As in FIG. 1, the system preferably operates with the Motorola ReFleX™ two-way wireless paging system infrastructure that allows communication both to and from the pager. It should be appreciated that other two-way communication systems are also contemplated. Referring to FIG. 6, dotted-line box 504 shows a paging infrastructure 510, box 506 shows a pager 530 worn by the user, and box 508 shows at least one pager 550 assigned to the user but not worn by the user.

Infrastructure 510 is a paging infrastructure that provides interfacing between a pager and typically a PSTN for communication of information with the pager. The operation of infrastructure 510 is well known to those familiar with the art. Preferably, infrastructure 510 is a Motorola ReFlex™ infrastructure, the software of which is modified to perform the operations shown in dotted-line box 504. Pager 530 is a transceiver capable of receiving and sending information and is preferably a Motorola Tango™ pager modified to perform the operations shown in dotted-line box 506. Pager 550 is alternatively a receive-only pager, operation of which is well known to those skilled in the art. The software of pagers 530 and 550 is modified to operate in accordance with the description of FIG. 3.

In accordance with the invention, at step 620, pager 530 receives an input from the user. Typically, the input occurs when the user depresses a button on the pager indicating a desire to change the status of the pager. The status of the pager is then changed in response to a sequence of button depressions. A status change includes a change in operating mode or information content of the pager. Changes in operating mode include changes in alert mode, such as changing a time of day alarm, changing from silent to audio alert mode, or selecting a different alert melody. Changes in operating mode also include changes in the status of a message, such as "unread", "read", "protect", and "delete" status of a message. Changes in operating mode also include changes in alert threshold information such as high or low values of a financial instrument information, sports scores, or other information received via an information paging service. Changes in operating mode also include changes in information content such as edits to received or stored information, additional information such as additions to Rolodex™ type information or calendar appointments. Changes in operating mode also include changes in key word search algorithms which search received information for desired words and generate a response such as generating an alert or storing the message having the key word. Implementation of the aforesaid status changes is well known to those skilled in the art of portable information managers such as pagers.

It is possible that during delay 630, additional changes to pager status will occur. The duration of delay 630 is a typical display time out interval where the pager enters a low power mode when displaying is ended. Any multiple pager status changes that occurred during delay 630 are transmitted in step 635 via a first message 640.

Status changes are stored as a reconfiguration of memory, preferably random access memory (RAM), in pager 530. Message 640 communicates the change in status by communicating a reconfiguration of memory in pager 530. In a preferred embodiment, pagers 530 and 550 have a common virtual memory structure, the virtual memory structure facilitating communication of status change information by communicating changes in pre-defined records in the common virtual memory structures. The virtual memory structure allows the physical memory structure to vary between pagers while maintaining a common virtual structure. Thus, the change in status of pager 530 is able to be communicated by identifying at least one record, and its contents, in its virtual memory that has been modified by the status change or changes occurring during step 620 and delay 630. For example, record one could contain the alert mode of the pager, record two could contain a time of day alarm, record three could contain a message number and its status, record four through seven could contain the message associated with record one, record eight could contain a key word search term, and record nine could contain high and low search limits within a message. In alternate embodiments, other techniques may be used to indicate changes in the status of the pager.

FIG. 6 shows the structure of message 640, having an address field 641 for identifying pagers 530 and 550, a memory record identifier, or virtual memory address, in field 642 for indicating which memory record was affected by the status changes occurring during step 620 and delay 630, the contents of the changed memory record, 643, and an origin field 644 for uniquely identifying pager 530 as the source of message 640. Alternatively, message 640 contains a plurality of field 642 and a plurality of field 643 for indicating a plurality of status changes occurring during step 620 and delay 630. Infrastructure 510 receives message 640 at step 645, and in step 650 transmits the change of status of pager 530 via a second message, message 655.

Figure 7:
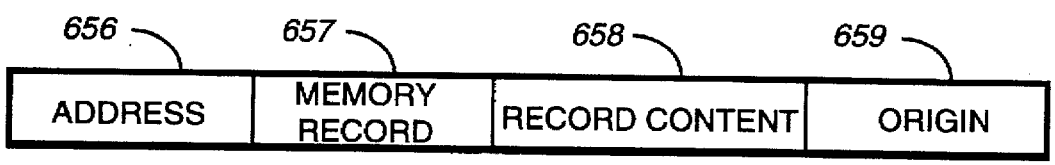
FIG. 7 is a simplified signaling diagram of fields of a message, shown symbolically in FIG. 5, transmitted by an infrastructure, for changing status of the other pager in accordance with the preferred embodiment of the present invention.

FIG. 7 shows the structure of message 655, having an address field 656 for identifying pagers 530 and 550, a memory record identifier 657 for indicating which memory record was affected by the status changes occurring at step 620 and delay 630, the contents of the changed memory record, 658, and an origin field 659 for uniquely identifying pager 530 as the source of the status change. The structure of message 640 shown in FIG. 6 appears substantially identical to the structure of message 655 shown in FIG. 7; however, it should be understood that only the information content conveyed by the messages 640 and 655 are substantially identical, and that the encoding scheme and the manner of inserting the message into the ReFlex protocol is preferably different for transmissions made by a pager compared with transmissions made by the infrastructure. Message 640 is transmitted by pager 130. Message 655 is transmitted by the infrastructure in response to receipt by the infrastructure of message 640.

Referring now to FIG. 5, message 655 is received by pager 530 is step 660 and ignored since it was the source of the message. Message 655 is also received by pager 550 in step 665. In this step, pager 530 checks the origin field 659, and after establishing itself as the pager that originated the message 655, ignores the message 655. Similarly, pager 550, upon checking the origin field 659 determines that it is not the origin of the status change, and in response, pager 550 changes its status to correspond to the status of pager 530 set by the user placing inputs to pager 530 at step 620 and delay 630. This is done by replacing the status of virtual memory records in the memory of pager 550 with the contents of corresponding one or more field 658, thereby effecting the status change.

Thus, the status of all of the user's pagers (in this example, pager 530 and pager 550) will be identical upon execution of step 675. Consequently, when the user changes from pager 530 to pager 550 in response to changing attire, or otherwise, the status of both pagers will be substantially identical.

Furthermore, similar to delay 230, delay 630 has the advantage of reducing the number of status change transmissions. For example, when a user enters or changes a financial instrument alert threshold, and the user wants an alert when a certain stock reaches a certain value, it is possible that the user changes the threshold several times during the delay interval while deciding upon a final value. Delay 630 only allows transmission of the value preferably after the display times out and enters a battery saving mode. Thus, if the user changes the threshold four times, only a signal indicative of the last threshold entered corresponding to the financial instrument would be transmitted. Consequently, only a single set of messages 640 and 655 is transmitted indicating a status change. Thus, in this example, delay 630 reduces by 75% the amount of messages communicated in the paging system in order to keep the status of pagers 530 and 550 synchronized. Furthermore, since the user is monitoring pager 530 during delay 630, if a financial instrument value is received that exceeds an interim threshold value entered into pager 530, an alert will be generated by pager 530. However, since the interim threshold value was not transmitted to pager 550, no alert would be generated by pager 550. This of no great consequence because the user is monitoring pager 530, and not pager 550, and therefore the user receives the desired alert. The user is thus able to take a desired action, such as ordering the purchase or sale of the financial instrument, based upon the alert. In any event, the user is able to switch from using pager 530 to pager 550 knowing that the financial instrument threshold in both pagers is identically set.

Similar examples of the advantages of the pause that occurs during the delay 630 include entry of information in a calendar or "Rolodex" information on acquaintances. Delay 630 allows the user to change the entry of information during the delay without transmitting a signal indicative of each iteration of the entered information. This reduces the information loading of the infrastructure in communicating the changes to the status of the user's pagers. Furthermore, since the pager's transmitter is operated less frequently, delay 630 and delay 230 have the advantage of reducing the power consumed by a battery powering the pagers 130 and 530, thereby improving the battery life of the pagers.

The present invention includes a method of communicating changes in a status of message information in a pager 130 including the steps of: wirelessly receiving a first message from a base station, the first message having first information for a user of the pager and having a status associated therewith; changing the status of the first information responsive to an input to the pager; and wirelessly transmitting a second message having second information indicative of the status of the first information to the base station responsive to the step of changing.

The invention also includes a method of synchronizing message information among a plurality of transceivers, such as pager 130 and pager 150, including the steps of: transmitting, in step 200, by a wireless messaging infrastructure a first message having a first status; in one transceiver, such as pager 130, of the plurality of transceivers, changing, in step 220, the first status of the first message to a second status responsive to an input to the one transceiver, and transmitting, in step 235, a second message indicative of the second status; in the wireless messaging infrastructure, receiving, in step 245, the second message, and responsive to receiving the second message, transmitting, in step 250, a third message indicative of the second status; and, in at least one other transceiver, such as pager 150, of the plurality of transceivers, receiving, in step 265, the third message, and responsive to receiving the third message, changing, in step 275, the first status of the first message to the second status.

The invention further includes a method of synchronizing a status a plurality of transceivers, such as pager 530 and pager 550, including the steps, in a first transceiver, of: changing the status, in step 620, of the first transceiver from a first status to a second status as a result of an input from a user, and transmitting, in step 635, a first message indicative of the second status; and also comprising, in a wireless messaging infrastructure, the steps of: receiving, in step 645, the first message, and transmitting, in step 650, a second message indicative of the second status; and further comprising, in a second transceiver, the steps of: receiving, in step 665, the second message, and changing, in step 675, a status of the second transceiver to the second status in response thereto, wherein the first transceiver and the second transceiver have a multiplicity of status categories that include received message status, time of day alarm status, message key word status, or message threshold value status, each of the status categories having a plurality of states, and the first message is a signal indicative of a state of a status category which has changed in response to the input.

The microprocessor and the software that controls the microprocessor in pager 530 comprise means in at least one communication device of the plurality of communication devices for changing a status category of the at least one communication device of the plurality of communication devices to produce a current state of the status category. The microprocessor, the software that controls the microprocessor, and a transmitter in pager 530 comprise means in the at least one communication device of the plurality of communication devices to produce a synchronizing signal for signaling to the infrastructure 510 the current state of the status category. The receiver, the transmitter, the controller of the infrastructure 510, and the software of the controller comprise means in the infrastructure 510 to produce a current state signal for signaling to another communication device of the plurality of communication devices the current state of the status category of the at least one communication device of the plurality of communication devices in response to the synchronizing signal. The receiver, the microprocessor, and the software of the microprocessor of pager 550 comprise means in the other communication device of the plurality of communication devices for changing the current state of the at least one status category of the other communication device of the plurality of communication devices to the current state of the at least one communication device of the plurality of communication devices responsive to the current state signal.

Thus, it should be apparent by now that the present invention provides a method of synchronizing the state of message information among a plurality of selective call transceivers, or pagers. In particular, the method advantageously provides a method of communicating changes in status category of message information, from among a multiplicity of status categories, in a first transceiver to a second transceiver. When a first status in a transceiver is changed to a subsequent status as a result of a subsequent input to the first transceiver, the invention provides a method of automatically changing the first status in a second transceiver to the subsequent status.

While a detailed description of a preferred embodiment of the invention has been given, it should be appreciated that many variations can be made thereto without departing from the scope of the invention as set forth in the appended claims. Further, the invention is not limited to selective call transceivers, or two-way pagers, but can be used with other types of two-way communication devices, both fixed and portable, both wireless and wireline.

We claim:

1. A method of synchronizing message information among a plurality of transceivers comprising the steps of:

transmitting by a wireless messaging infrastructure a first message having a first status;

in one transceiver of the plurality of transceivers, changing the first status of the first message to a second status responsive to an input to the one transceiver, and transmitting a second message indicative of the second status;

in the wireless messaging infrastructure, receiving the second message, and responsive to receiving the second message, transmitting a third message indicative of the second status; and in at least one other transceiver of the plurality of transceivers, receiving the third message, and responsive to receiving the third message, changing the first status of the first message to the second status.

2. The method according to claim 1 wherein the first status is an unread status and the second status is includes read, deleted or protected status.

3. The method according to claim 1 further comprising the steps of: in the at least one other transceiver, changing the first status of the first message to a third status responsive to an input to the at least one other transceiver, and transmitting a fourth message indicative of the third status; in the wireless messaging infrastructure, receiving the fourth message, and transmitting a fifth message indicative of the third status; and in the one transceiver, receiving the fifth message, and changing the first status of the first message to the third status responsive to receiving the fifth message.

4. The method according to claim 1 wherein said step of transmitting the second message indicative of the second status in the one transceiver further comprises the steps of:

delaying transmission of the second message by a predetermined time period after changing the first status of the first message;

changing the first status of the first message to a subsequent status in response to a subsequent input to the one transceiver; and transmitting the subsequent status as the second status if changing of the first status to the subsequent status occurs within the predetermined time period.

5. A method of synchronizing a status of a plurality of transceivers comprising the steps of:

in a first transceiver, changing the status of the first transceiver from a first status to a second status as a result of an input from a user, and transmitting a first message indicative of the second status;

in a wireless messaging infrastructure, receiving the first message, and transmitting a second message indicative of the second status; and in a second transceiver, receiving the second message, and changing a status of the second transceiver to the second status in response thereto.

6. The method according to claim 5 further comprising the steps of: in the first transceiver, receiving the second message; and decoding the second message without further changing the status of the first transceiver.

7. The method according to claim 5 wherein the first transceiver and the second transceiver have a multiplicity of status categories, each of the multiplicity of status categories having a state, and the first message is a signal indicative of state of status category which has changed in response to the input.

8. The method according to claim 7 wherein the multiplicity of status categories include received message status, time of day alarm status, message key word status, or message threshold value status.

9. The method according to claim 5 wherein said step transmitting the first message indicative of the second status in the first transceiver further comprises the steps of:

delaying transmission of the first message by a predetermined time after changing the status of the first transceiver;

changing the status of the first transceiver to a subsequent status responsive to a subsequent input to the first transceiver; and transmitting the subsequent status as the second status if the changing of the status to the subsequent status occurs within the predetermined time.

10. A system for synchronizing a status category of a plurality of wireless communication devices communicating with a wireless paging infrastructure, each of the plurality of communication devices having at least one status category, each of the at least one status category having a plurality of states, comprising:

means in at least one communication device of the plurality of communication devices for changing a status category of the at least one communication device of the plurality of communication devices to produce a current state of the status category;

means in the at least one communication device of the plurality of communication devices to produce a synchronizing signal for signaling to the infrastructure the current state of the status category;

means in the infrastructure to produce a current state signal for signaling to an other communication device of the plurality of communication devices the current state of the status category of the at least one communication device of the plurality of communication devices in response to the synchronizing signal; and means in the other communication device of the plurality of communication devices for changing the current state of the at least one status category of the other communication device of the plurality of communication devices to the current state of the at least one communication device of the plurality of communication devices responsive to the current state signal.

11. A system for synchronizing messages among a multiplicity of selective call transceivers communicating with a wireless paging infrastructure, the wireless paging infrastructure having a base transmitter and a controller, each of the multiplicity of selective call transceivers having a processor and a transmitter, and at least one status category, each of the at least one status category having a plurality of states, the system comprising:

a user interface on at least one of the multiplicity of selective call transceivers for changing a state of a status category of the at least one of the multiplicity of selective call transceivers to produce a synchronizing signal and coupled to the processor;

a software element at the processor for controlling transmission of a synchronizing signal by the transmitter after a change of state of a status category; and another software element at the controller for controlling transmission of a current state signal by the base transmitter responsive to the synchronizing signal.

* * * * *